United States Patent
Chinn et al.

(10) Patent No.: US 7,289,499 B1
(45) Date of Patent: Oct. 30, 2007

(54) INTEGRATED SYSTEM AND METHOD FOR CONTROLLING TELECOMMUNICATION NETWORK DATA COMMUNICATED OVER A LOCAL AREA NETWORK AND STORAGE DATA COMMUNICATED OVER A STORAGE AREA NETWORK

(75) Inventors: Stephen R. Chinn, Westford, MA (US); Gene M. Ciancaglini, Dover, NH (US); Michael M. Garofalo, Portsmouth, NH (US); James A. Hart, Rochester, NH (US); Steven Lumetta, Champaign, IL (US); Michael Lupinacci, Barrington, NH (US); Paul Marichal, Strafford, NH (US); Muriel Medard, Arlington, MA (US); John D. Moores, Concord, MA (US); Guy Oliveira, Dover, NH (US); Salil A. Parikh, Belmont, MA (US); Mark R. Parquette, Rye, NH (US); William Proulx, Sanbornville, NH (US); Donald Proulx, Dover, NH (US); Michael Rydeen, Portsmouth, NH (US)

(73) Assignee: Network Appliance, Inc., Sunnyvale, CA (US)

(*) Notice: Subject to any disclaimer, the term of this patent is extended or adjusted under 35 U.S.C. 154(b) by 1024 days.

(21) Appl. No.: 10/196,342

(22) Filed: Jul. 16, 2002

Related U.S. Application Data

(60) Provisional application No. 60/306,651, filed on Jul. 18, 2001, provisional application No. 60/305,724, filed on Jul. 16, 2001.

(51) Int. Cl.
    *H04L 12/28* (2006.01)
(52) U.S. Cl. .................................................. 370/389
(58) Field of Classification Search ...................... None
    See application file for complete search history.

(56) References Cited

U.S. PATENT DOCUMENTS

| | | | | |
|---|---|---|---|---|
| 4,929,939 A | * | 5/1990 | Varma et al. | 340/2.24 |
| 5,124,987 A | * | 6/1992 | Milligan et al. | 714/7 |
| 6,076,115 A | | 6/2000 | Sambamurthy et al. | |
| 6,148,414 A | * | 11/2000 | Brown et al. | 714/9 |

(Continued)

OTHER PUBLICATIONS

Kramer et al, Ethernet PON (ePON): Design and Analysis of an Optical Access Network, University of California, pp. 1-25, Aug. 2000.*

(Continued)

*Primary Examiner*—Frank Duong
(74) *Attorney, Agent, or Firm*—Blakely Sokoloff Taylor & Zafman LLP

(57) ABSTRACT

A method and apparatus for a communications network that executes a medium access control (MAC) protocol that permits multiple access to a shared medium or shared switching fabric. The MAC protocol uses a bandwidth allocator to regulate access to the network by sending a permission message to a node, allowing it to transmit to a specific set of nodes for a specific length of time. The medium and switching fabric can carry one or more protocols, each of varying framing format and native bitrate. The switching fabric provides a connection-oriented bufferless data transport service that preserves frame ordering. An illustrative embodiment uses a slotted master/slave time-division multiplexed access (TDMA) scheme to allow flexible provisioning of network bandwidth.

22 Claims, 6 Drawing Sheets

U.S. PATENT DOCUMENTS

| | | | |
|---|---|---|---|
| 6,400,730 B1 * | 6/2002 | Latif et al. | 370/466 |
| 6,546,014 B1 * | 4/2003 | Kramer et al. | 370/395.41 |
| 6,658,009 B1 * | 12/2003 | Yamashita et al. | 370/395.65 |
| 6,718,139 B1 * | 4/2004 | Finan et al. | 398/59 |
| 6,792,507 B2 * | 9/2004 | Chiou et al. | 711/119 |
| 7,031,343 B1 * | 4/2006 | Kuo et al. | 370/473 |
| 7,089,293 B2 * | 8/2006 | Grosner et al. | 709/217 |
| 2003/0189935 A1 | 10/2003 | Warden et al. | |

OTHER PUBLICATIONS

Eytan Modiano, et al., "A Novel Medium Access Control Protocol for WDM-Based LAN's and Access Networks Using a Master/Slave Scheduler", Journal of Lightwave Technology, vol. 18, No. 4, Apr. 2000, pp. 461-468.

Mounir Hamdi et al., "Scalable High-Speed Switches/Routers with QoS Support", IEEE Communications Magazine, pp. 61-69, Dec. 2000.

* cited by examiner

INTEGRATED SYSTEM AND METHOD FOR CONTROLLING TELECOMMUNICATION NETWORK DATA COMMUNICATED OVER A LOCAL AREA NETWORK AND STORAGE DATA COMMUNICATED OVER A STORAGE AREA NETWORK

CROSS REFERENCE TO RELATED APPLICATIONS

This application claims the benefit of U.S. patent application Ser. No. 09/994,475 filed on Jan. 26, 2001 and also claims benefit of U.S. Provisional Patent Application Nos. 60/306,651, filed on Jul. 18, 2001, and 60/305,724 filed on Jul. 16, 2001 all of which are incorporated herein by reference in their entirety.

FIELD OF THE INVENTION

The invention relates to a communications system. More particularly, the present invention relates an integrated system and method for controlling telecommunication network data communicated over a local area network and storage data communicated over a storage area network.

BACKGROUND OF THE INVENTION

A conventional connectionless switched communication system may be used to communicate information within a local area network ("LAN") and within a storage area network ("SAN"). The LAN can include a plurality of user nodes or computers (e.g. personal computers) coupled to a plurality of servers, via an Ethernet hub or an Ethernet switch. The SAN can include a plurality of mass storage systems and/or devices, such as disk drive systems, tape drive systems and/or optical storage systems, coupled to the plurality of servers, via a Fibre Channel switch for example.

In communicating information from the user nodes to the mass storage systems, the user nodes provide a plurality of data packets in an Ethernet format, which are subsequently received at the Ethernet switch, along with pertinent information related to the address of the destination server. The Ethernet switch buffers the incoming data packets and re-routes the data packet to the indicated server without prior knowledge of traffic patterns. The server receives the data packets from the user node and processes the data packets to reformat the data packets into a Fibre Channel format, which are used for communication with the SAN. The data packets are received at the Fibre Channel switch from the server. The Fibre Channel switch responds to receipt of the data packets by buffering the data packets and re-routing the data packets to the appropriate mass storage device to store the data packets.

Communicating information from the mass storage systems to the user computers is similar to that described above for communicating information from the user computers to the mass storage systems. More specifically, at least one of the mass storage systems can respond to a request for information received from one or more of the user computers by retrieving and packaging previously stored information into a plurality of data packets in a Fiber channel format. The data packets in the Fibre Channel format may be received and buffered at the Fibre Channel switch. Further, the Fibre Channel switch re-routes the data packets to the appropriate server which is coupled to the user computer that requested the information. In this instance, the server receives the data packets in the Fibre Channel format from the Fibre Channel switch and processes the data packets to reformat the data packets into an Ethernet format, which is suitable for communication over the LAN. The data packets are thereafter received at the Ethernet switch, which again buffers the incoming data packets in the Ethernet format and re-routes the data packets to the user computer that requested the information without prior knowledge of the traffic patterns.

One problem may occur when a plurality of user nodes communicate a plurality of data packets to the Ethernet switch in random bursts, which can cause the buffer associated with the Ethernet switch to overflow. When the buffer of the Ethernet switch overflows, subsequently communicated data packets may be dropped or lost. Temporarily halting receipt of data packets in the Ethernet Switch until the buffer can be emptied avoids the problem of dropping or losing data, however, this approach significantly reduces system performance (e.g. by introducing undesirable latencies into the systems). The Fibre Channel switch can also experience similar problems related to buffer overflows as that described above with respect to the Ethernet switch.

It is not sufficient to simply increase the size of the buffer(s) to accommodate the data packets because this can result in long delays in moving the data packets in and out of the buffer, which also introduces system latencies and seriously degrades system performance. Further, large buffers may be costly and difficult to design in practice, especially for high-speed systems.

Another problem in the above-described conventional connectionless switched communication system is related to the significant overhead processing that is carried out by the servers to convert or re-format the data packets back and forth between the Ethernet format (e.g. suitable for communication over the LAN) and the Fibre Channel format (e.g. suitable for communication over the SAN). Further, system configurations that support both Ethernet and Fibre Channel data formats typically require specific hardware, as described above, for supporting each protocol or data format.

Therefore, an unsolved need remains for a data communication system that can support a plurality of protocols and reduce or eliminate the overhead processing that is carried out by the servers to convert or re-format the data packets back and forth between the Ethernet protocol and the Fibre Channel protocol.

SUMMARY OF THE INVENTION

In accordance with embodiments of the present invention, set forth is a system for bufferless data communications between a plurality of nodes coupled to the system using a common protocol. The system for bufferless data communications includes a controller adapted to formulate and communicate a plurality of messages in the common protocol and a switching network coupled to the controller. The system further includes at least one node cluster module, which is coupled to the switching network and to the plurality of nodes. In one aspect of the present invention, the plurality of nodes includes two or more of a server system, a disk drive storage system, a tape drive storage system, an optical storage system or a magneto-optical storage system.

The controller includes a bandwidth allocation module, which is operative to formulate at least the first message of the plurality of messages in the common protocol and to dynamically adjust the predetermined duration. The controller is adapted to actuate the switching network to form a bufferless coupling between at least a first node of the plurality of nodes and at least a second node of the plurality of nodes. Furthermore, the controller is adapted to communicate at least a first message of the plurality of messages in the common protocol to at least the first node of the plurality of nodes via the node cluster module. The first message of the plurality of messages instructs the first NODE of the plurality of nodes to communicate predetermined data in the common protocol for a predetermined duration to the second node of the plurality of nodes over the bufferless coupling.

The switching network includes an electronic crosspoint switch. The electronic crosspoint switch includes a plurality of inputs and a plurality of outputs, whereby at least one of the plurality of inputs and at least one of the plurality of outputs is coupled to at least a first group of nodes of the plurality of nodes via the at least one node cluster module. The switching network further includes an optical-to-electrical converter coupled between each of the plurality of inputs of the switching network and the node cluster module. The switching network further includes an electrical-to-optical converter coupled between each of the plurality of outputs of the switching network and the node cluster module.

In another aspect of the present invention, the switching network includes an optical crosspoint switch. The optical crosspoint switch include a plurality of inputs and a plurality of outputs, whereby at least one of the plurality of inputs and at least one of the plurality of outputs is coupled to at least a first group of nodes of the plurality of nodes via the at least one node cluster module. The at least one node cluster module includes a plurality of pairs of ports that are adapted to permit at least the first group of nodes of the plurality of nodes to couple to the at least one node cluster module.

In another aspect of the present invention, the system for bufferless data communications further includes at least one access module coupled to the switching network that is adapted to accept one or more network interface cards. The one or more network interface cards may include at least one Gigabit Ethernet card and/or at least one Fibre Channel card.

In accordance with another embodiment of the present invention, set forth is a method of communicating a plurality of data packets over a bufferless communication system using a common protocol. The method includes generating a first instruction message at a controller. The first message includes a source address associated with a first node of a plurality of nodes and a destination address associated with a second node of the plurality of nodes. The method further includes receiving and processing the first instruction message at the first node of the plurality of nodes by sending a plurality of predetermined packets of data for a predetermined duration to the second of the plurality of nodes over a bufferless communication path. The bufferless communication path may be formed by actuating a switching network to couple the first node and the second node of the plurality of nodes.

In accordance with another embodiment of the present invention, set forth is a method of communicating information over a bufferless data communication system that includes a switching network coupled to a controller and to a plurality of nodes. The method includes forming at least one bufferless data communication path between at least a first node of the plurality of nodes and at least a second node of the plurality of nodes by providing predetermined control signals to the switching network from the controller. The method further includes communicating at least one predetermined instruction message from the controller to the first node. In one aspect, the at least one predetermined instruction message includes communicating at least one bandwidth allocation message. The first node responds to receipt of the at least one predetermined instruction message by communicating one or more packets of data to the second node for a predetermined duration over the at least one bufferless data communication path.

In one aspect of the present invention, providing the predetermined control signals to the switching network from the controller includes providing the predetermined control signals to an electronic crosspoint switch. The electronic crosspoint switch includes a plurality of inputs coupled to the plurality of nodes and a plurality of outputs coupled to the plurality of nodes.

In accordance with another embodiment of the present invention, set forth is a method of communicating information over a bufferless data communication system, which includes a switching network coupled to a controller and to a plurality of nodes. The method includes forming at least one bufferless data communication path between at least a first node of the plurality of nodes and the controller by providing predetermined control signals to the switching network from the controller. The method further includes communicating at least one predetermined instruction message from the controller to the first node. In one aspect of the present invention, communicating the at least one predetermined instruction message includes communicating at least one system management bandwidth allocation message. The first node responds to receipt of the at least one predetermined instruction message by communicating one or more packets of data to the controller for a predetermined duration over the at least one bufferless data communication path.

The method further includes receiving the one or more packets of data for the predetermined duration over the at least one bufferless data communication path at the controller. The controller responds by processing the data to determine predetermined characteristics of the first node. Based on the determine predetermined characteristics of the first node, the processor adjusts characteristics associated with communications between the first node of the plurality of nodes and at least a second node of the plurality of nodes. In one aspect, the characteristics associated with communications between the first node of the plurality of nodes and the second node of the plurality of nodes includes the number of data packets communicated from the first node to the second node of the plurality of nodes. In another aspect, the characteristics associated with communications between the first node of the plurality of nodes and the second node of the plurality of nodes includes the duration for which data packets may be communicated from the first node to the second node of the plurality of nodes.

BRIEF DESCRIPTION OF THE DRAWINGS

The foregoing and other objects of this invention, the various features thereof, as well as the invention itself, can be more fully understood from the following description, when read together with the accompanying drawings in which.

DETAILED DESCRIPTION OF THE INVENTION

Figure 1:
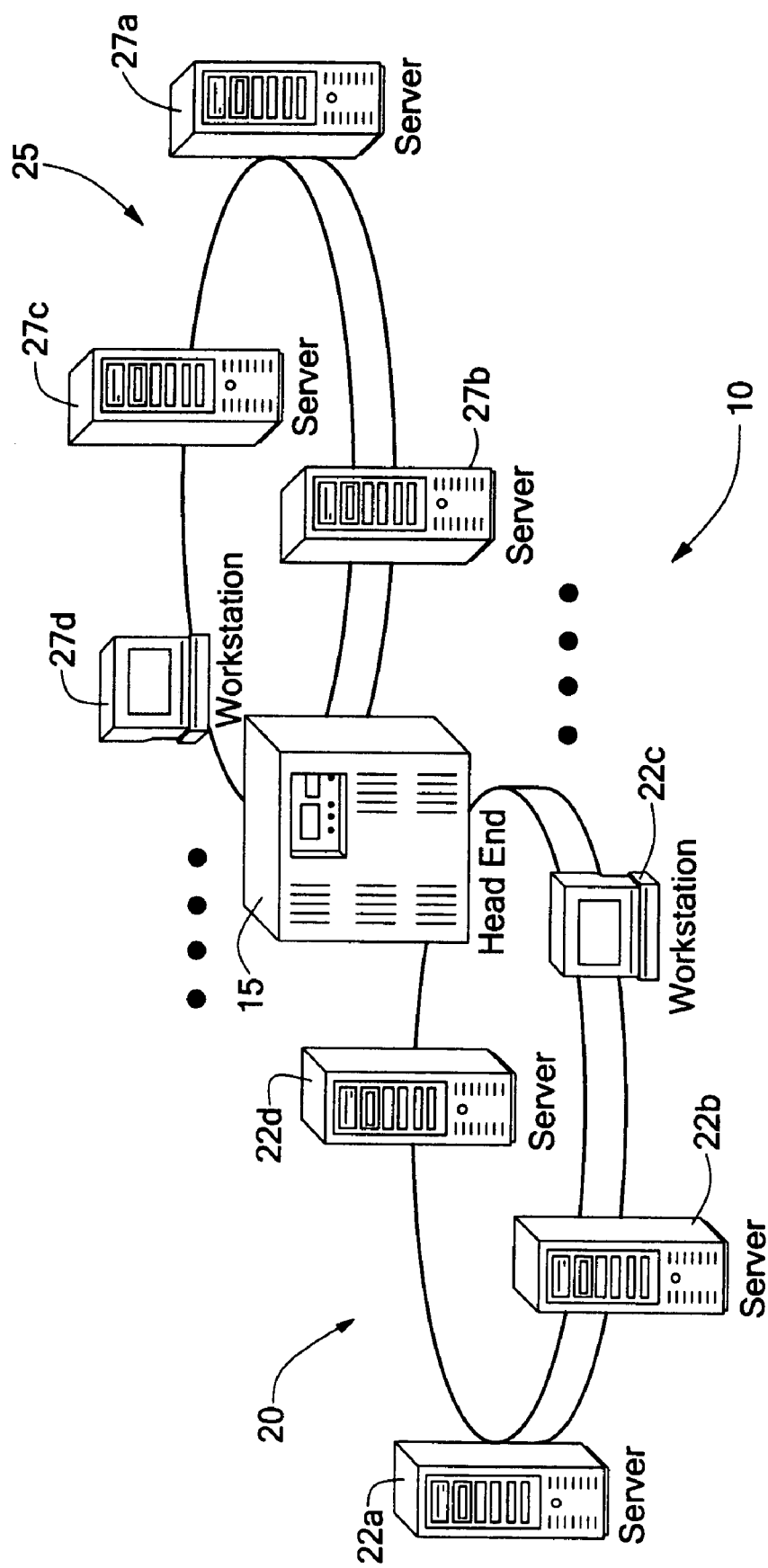
FIG. 1 is a block diagram of a unified network and switching fabric able to simultaneously support a plurality of different protocols.

Before referring to the figures describing the present invention, some introductory concepts and terminology are described. A method and apparatus for a communications network that illustrates the present invention is described. Although the networking system is sometimes described herein in the particular context of a fiber-optic local-area network (LAN), it should be understood that the networking system can also be used in a metropolitan-area network (MAN), or a wide-area network (WAN), or a Passive Optical Network (PON), or a storage-area network (SAN). Furthermore, it should be understood that the transmission medium is not limited to fiber-optic transmission media (e.g. fiber optic) cables. Rather, non-optical transmission media (including wireless transmission media) may also be used. The optical networking system will be referred to as the ONS. The computers, processors or storage systems attached to the ONS will be referred to as "ONS nodes" or more simply "NODEs." It should be appreciated that use of the terms "node" or "nodes" in this document refers to any type of node (e.g. an optical node, a non-optical node, a node coupled to an optical network or a node coupled to a non-optical network).

The ONS includes a means of carrying multiple communication protocols, thereby eliminating the need for a separate network for each individual protocol. For example, the ONS can carry both Gigabit Ethernet (GbE) and Fibre Channel (FC) frames, thus eliminating the need for separate networks for data traffic (which typically uses GbE) and storage traffic (which typically uses FC). The ONS, in fact, can carry any number of protocols; it is only the NODE's network interface card (NIC) that determines which protocols are implemented.

In general, the ONS includes a central switching fabric, called a headend, which provides a provisioned circuit-oriented bufferless frame delivery switching system. This is in contrast to connectionless systems in which each intermediate switch in the path from "a source NODE" (or more simply "a source") to a destination NODE (or more simply a destination) must read and process each frame in order to properly direct the frame through the network. In the ONS, an end-to-end circuit path is pre-allocated for each group of frames destined for a common NODE, so that frames may be transported directly from transmitter to receiver (or multiple receivers in the case of a multicast transmission) without the need for any intermediate processing or buffering at the headend. These circuit paths are established just-in-time for the transmission, and exist for the duration of the transmission before being reconfigured for the next set of transmissions. Unlike traditional circuit-oriented systems, the circuits in this system can have a lifetime as short as one frame.

The ONS uses a medium access control (MAC) protocol to permit multiple access to a shared medium and shared switching fabric. The MAC executes a process known as the "bandwidth allocator" to regulate access to the network by sending a directive referred to herein as a bandwidth allocation message (BAM) to a NODE, allowing it to transmit to a specific set of destination NODEs for a specific length of time. The length of time, called a "timeslot", indicates the boundaries of the transmission, not the internal framing format of the encapsulated frame.

The BAMs are sent over a control channel, distinguishable from the data-traffic bearing channel. Upon receiving the BAM, the NODE transmits frames to the indicated destination NODE(s), for all, or part, or even none of the permitted duration. Although the system can be designed to allow a varying bitrate within the timeslot, the embodiment of the invention detailed here uses a common bitrate for all encapsulated protocols. Protocols such as GbE and FC, which have different native bitrates, are transmitted at a higher common bitrate in the ONS. The ONS provides a connection-oriented bufferless switching fabric without frame reordering. In the embodiment here, the ONS uses a slotted master/slave time-division multiplexed access scheme to allow flexible provisioning of network bandwidth. Numerous models of Quality of Service can be supported by the ONS, including: Constant Bit Rate, Variable Bit Rate, and Isochronous services, as well as best effort service. A key capability of the system of the present invention is that it periodically gathers feedback from NODEs to dynamically adapt the bandwidth allocator, to balance the need for dynamically varying loads while maintaining global constraints such as minimum levels of service to comply with service level agreements (SLA's)

To improve the utilization of the network, the ONS performs a "ranging" procedure to determine the distance of each NODE from the headend. Using this information, the bandwidth allocator can take the distance (i.e., propagation times and variability) into account to allow more efficiently packed pipelined transmissions.

The switching fabric within the headend is a crosspoint switch (or equivalent), which can map any input to any set of outputs. It should be understood that the switching fabric is not limited to a crosspoint switch implementation. The bandwidth allocator reconfigures the crosspoint switch according to the BAM, so that frames arriving as a result of that BAM are directly routed to the correct destination without any intermediate buffering. The crosspoint switch in the headend is a serial crosspoint, but a parallel crosspoint could also be used, and multiple crosspoints could be configured to form a switching fabric such as, but not limited to, a Clos, Benes, or Banyan network.

A notable aspect of the embodiment is that multiple NODEs can share a port on the crosspoint switch. The transmissions from a group of NODEs, called a "node cluster", share an input and output port of the crosspoint switch. In particular, the transmissions from the NODEs in a node cluster are optically and passively coupled together, allowing more NODEs to share the switching fabric, and provide the ability to partition system bandwidth among NODEs simply by the grouping of NODEs into a node cluster. If more bandwidth needs to be allocated to a particular NODE, it should share a crosspoint port with fewer NODEs.

In the embodiment discussed and detailed here, a headend performs the following functions: (a) assigns each NODE a timeslot by sending it a control message; (b) switches a transmission from a NODE through a switching fabric and delivers it to the receiving NODE (or multiple NODEs in the case of a multicast or broadcast transmission); (c) allows sharing of a crosspoint port by aggregating the transmissions from a group of NODEs and feeding them into one port; and (d) solicits feedback from the NODEs to dynamically change the transmission allocations in response to changing demands.

In the embodiment discussed and detailed here, a headend has the following features: (a) it uses a wavelength division multiplexed (WDMed) control channel to carry the control messages to the NODEs; (b) it passively and optically combines transmissions from a group of NODEs; (c) it uses a serial crosspoint to switch frames between groups of NODEs; (d) it uses a burst-mode receiver at the inputs to the crosspoint switching fabric; (e) it uses a passive optical backplane, in addition to an electrical backplane, between system boards in the headend; (e) it uses WDMed pilot tones to detect breaks in the fiber; and (f) it performs ranging to determine the locations of the NODEs and to increase performance of the network.

The present invention preferably operates with a medium access control (MAC) protocol allows the network to support simultaneous or concurrent transmission of multiple disparate protocols (e.g. GbE and FC protocols). One suitable MAC protocol, referred to herein as a transparent optical protocol-independent switching (TOPIX) protocol, allows the network to support simultaneous transmission of both GbE and FC traffic and is described in co-pending application Ser. No. 09/994,475 filed on Jan. 26, 2001, assigned to the assignee of the present invention and incorporated herein by reference in its entirety. The TOPIX protocol is capable of supporting an arbitrarily large number of protocols in the underlying traffic. However, both the headend and NICs need to be protocol-aware. In one embodiment, the system supports GbE and FC. Those of ordinary skill in the art should appreciate, however, that other protocols can also be supported. The TOPIX protocol manages traffic amongst servers and storage devices without the complexity of the separate management and separate switches required in current LAN plus SAN architectures.

With respect to data transmission and collection, the TOPIX protocol utilizes a scheme similar to time division multiple access (TDMA) as the means for sharing bandwidth on the wavelength used for data traffic. TOPIX defines the timeslots that are utilized for data transmission, and those that are used for signaling (including such functions as autodiscovery and feedback). In one embodiment, a bandwidth allocator sends BAMs from the headend to all NODEs on the wavelength that is reserved for BAMs. BAMs provide information to NODEs as to when they can transmit data, for how long, and to whom. A single BAM has an overall framing structure surrounding a sequence of "mini-BAMs." Each mini-BAM is directed to a NODE on a node cluster. Each BAM contains only one mini-BAM for each node cluster in the network. This is to prevent collisions (two NODEs transmitting simultaneously on a node cluster). BAMs thus implement a MAC and maintain the order within the network.

Data frames in the network of the present invention are transmitted into empty unframed timeslots that are allocated by the centralized bandwidth allocator at the headend. Because the timeslots are not framed by the headend, NODEs within the network can in principle transmit data in any format into these empty timeslots. In one embodiment, transmission is for GbE and FC protocols. The network is asynchronous in the sense that the NODEs need not share a global clock phase at the bit level. Data rates are nominally the same for all FC devices, and for all GbE devices throughout the network, but clock phase alignment is unnecessary.

There is a limit to how closely the bandwidth allocator can arrange to pack data from different NODEs at different distances away from the crosspoint switch into adjacent timeslots. The bulk of the timing uncertainty is eliminated by "ranging," a process that is performed during autodiscovery, and periodically during network operation. Ranging is a process by which the headend determines the relative delays associated with the different NODEs on the network. This is done by measuring the difference in time between when the headend sends out a BAM to a particular NODE until the time the data frame sent by that NODE in response to that BAM arrives at the crosspoint switch. The NODEs will incur different delays primarily as a function of where in the BAM the piece intended for the NODE (the "mini-BAM") lies.

Once this information is obtained, the bandwidth allocator can determine the longest delay in the network, and can then distribute to each NODE the difference between the maximum delay and that particular NODE's delay. The NODE can then store this delay. During network operation, the NODE will wait after receiving a BAM for this specified delay interval before sending out its data frame. This way the bandwidth allocator does not have to vary the BAMs to accommodate the different delays in the system.

Ranging resolves the most macroscopic timing issue, greatly increasing network efficiency. However, there are other timing considerations that dictate the use of gaps between transmissions on a node cluster. The first of these is uncertainty in the ranging, and the fact that in a network operating in accordance with the present invention, the fiber is a shared medium, shared by different sources (NODEs). In order to accommodate this timing uncertainty (i.e., the probability that data from different NODEs may overlap), part of each time slice is left "blank" to create a "GUARD-BAND". The presence of this GUARDBAND gives the network of the present invention data streams a "bursty" character not present in today's SANs and LANs, but which is a property of passive optical networks (PONs).

Furthermore, the different sources on a node cluster have different link losses to the headend, so that the transmissions from different sources not only have gaps between them, but the transmissions arrive at the headend with different optical power levels. This makes the transmitter and receiver hardware design more challenging because the high-bandwidth transceivers commercially available today are not equipped to deal with the fast-on/fast-off requirements of this kind of data. Furthermore, transceivers normally used for continuous transmission applications may have crosstalk issues during gaps. Lack of a global clock reference creates a need for rapid clock recovery.

The TOPIX framing of data is a preamble comprised of a fixed length pattern (e.g. 101010 . . . ) preceding the transmitted frame. This preamble is used for clock acquisition at receivers, and is necessary because of the asynchronous bit-level nature of the traffic (no global bit clock phase) and the dark gaps between transmissions. Furthermore, a destination address, obtained from the mini-BAM, is prepended to each data frame. In some embodiments, it is useful to include the entire mini-BAM (or a subset of the fields of the mini-BAM) in the preamble. Depending upon the clock recovery devices, there may also be a postamble added to each frame to maintain clock synchronization throughout a frame.

Because all routing is pre-established, a TOPIX network is inherently connection-oriented. This is in contrast to the current connectionless switched architectures used in conventional LANs and SANs.

The internal processing required in the network of the present invention is less complicated than that of a typical LAN or SAN. The bandwidth allocator gathers requests from the NODEs in the network, measures traffic on the network and builds a traffic model, measures propagation times between NODEs and the headend switch, applies filtering and prioritization to maintain QoS guarantees, is aware of the processing limitations of receivers, and is aware of the throughput implications of grouping traffic by source and destination NODE pairs and protocol ("connections"). Given all of this information, the bandwidth allocator decides how best the requests can be fulfilled and sends out BAMs to indicate to the appropriate NODEs when to transmit or receive data. The bandwidth allocator also calculates when to reconfigure the SWITCH_BLADE in the headend.

A simple embodiment of the bandwidth allocator allocates fixed timeslots in a round-robin manner. In other words, the bandwidth allocator polls the devices on the network and allocates different fractions of the available bandwidth to the different NODEs. Ideally, the bandwidth allocator updates its traffic model to dynamically reallocate resources as needed.

Referring to FIG. 1, a system 10 for bufferless data communications includes a headend controller 15 coupled to one or more groups of NODEs or node clusters, for example, the first node cluster 20 and the second node cluster 25. The first node cluster 20 includes a one or more NODEs, such as the NODEs 22a, 22b, 22c and 22d, which are hereinafter collectively referred to as "NODEs 22." Furthermore, the second node cluster 25 also includes one or more NODEs, such as the NODEs 27a, 27b, 27c and 27d, which are hereinafter collectively referred to as "NODEs 27."

In this arrangement, the headend controller 15 communicates with one or more of the NODEs 22, which are located on the first node cluster 20 to execute data communications between two or more NODEs 22 located on the first node cluster 20 (e.g. intra-node cluster communications) or between a NODEs 22 and the headend controller 15. Similarly, the headend controller 15 communicates with one or more of the NODEs 27, which are located on the second node cluster 25 to execute data communications between two or more NODEs 27 located on the second node cluster 20 or between a NODEs 27 and the headend controller 15. In addition, the headend controller 15 can communicate with one or more of the NODEs 22 and/or 27, which are respectively located on the first 20 and second 25 node clusters to execute data communications between NODEs 22 and 27 located on the first 20 and second 25 node clusters (e.g. inter-node cluster communications).

In one embodiment, the plurality of NODEs 22 and/or 27, which are respectively located on the first 20 and second 25 node clusters can include a number of data processing systems, such as servers, workstations and/or personal computers. Furthermore, the plurality of NODEs 22 and/or 27 can also include a number of data storage systems, such as disk drive systems, tape drive systems, optical storage systems, magneto-optical storage systems and/or solid state storage systems. The headend controller 15 and NODEs 22, 27 operate in accordance with a protocol of the type described in co-pending application Ser. No. 09/994,475, filed on Jan. 26, 2001.

Figure 2:
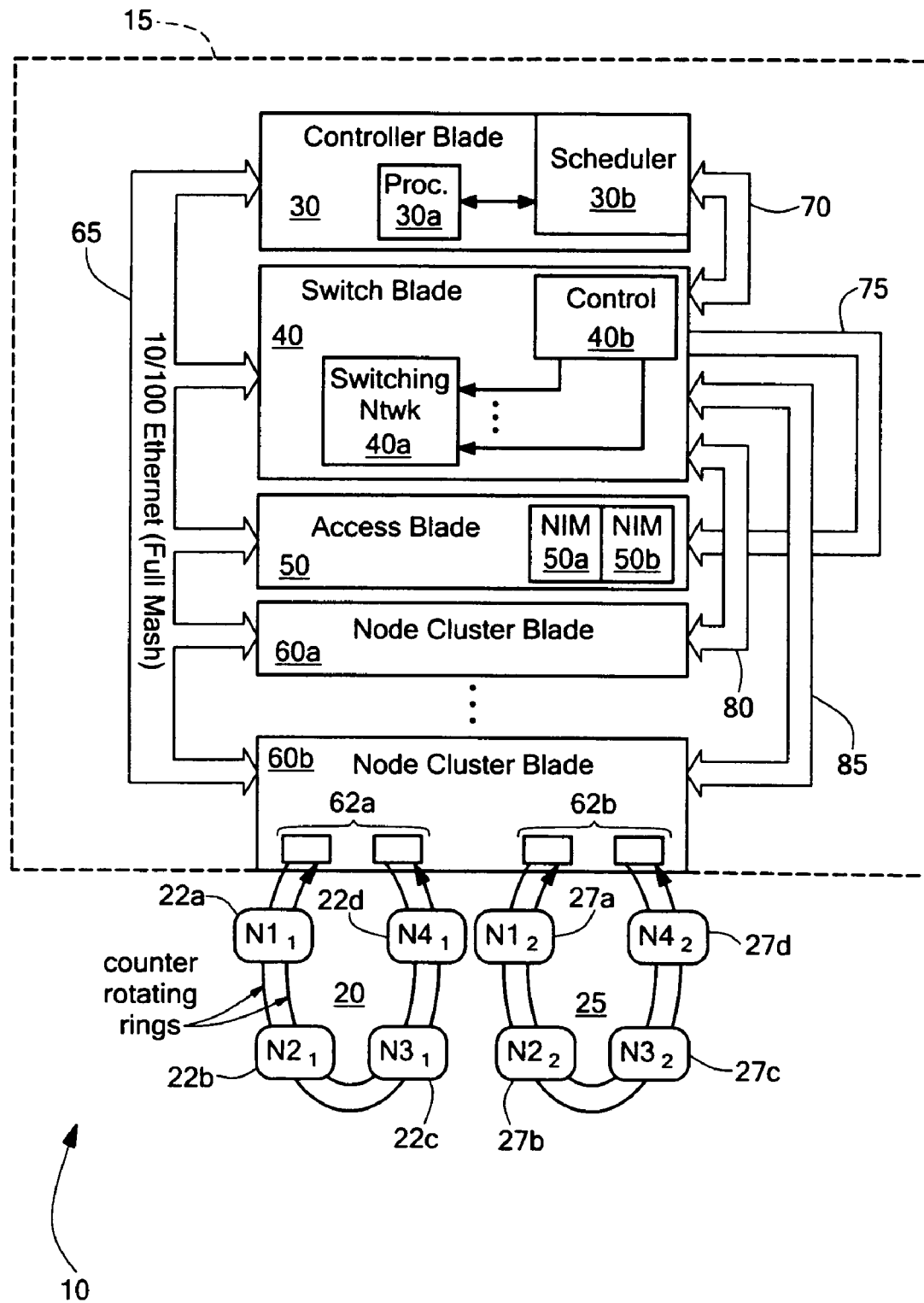
FIG. 2 is a detailed block diagram of the network of FIG. 1.

Referring to FIG. 2, the headend controller 15 more specifically includes a controller blade or module 30 (which is referred to hereinafter as "controller 30"), which is coupled to a SWITCH_BLADE 40, an access blade 50 and one or more node cluster blades 60a-60b over a common first data bus 65. The controller 30 is further coupled to the SWITCH_BLADE 40 over a second data bus 70. The SWITCH_BLADE 40 is further coupled to the access blade 50 over a third data bus 75, to the node cluster blade 60a over a fourth data bus 80 and to the node cluster blade 60b over a fifth data bus 85.

The controller 30 includes a processor 30a, which is coupled to a bandwidth allocator module 30b. The processor 30a interacts with the bandwidth allocator module 30a to formulate a plurality of control messages that can be communicated to one or more of the NODEs 22 and/or 27 respectively located on the first 20 and second 25 node clusters. The one or more NODEs 22 and/or 27, which receive the control messages may be referred to as "source NODEs." For example, one source NODE may be NODE 20a located on node cluster 20. The source NODE 20a may respond to receipt of a control message by communicating a predetermined number of data packets for a predetermined duration or during a predetermined time interval to one or more other NODEs 22 and/or 27 respectively located on the first 20 and second 25 node clusters. The NODEs that receive the predetermined number of data packets from the source NODE, which is NODE 22a in the exemplary embodiment, are hereinafter referred to as "destination NODEs." For example, one destination NODE may be NODE 27a located on node cluster 25. The process of communicating information or data packets from the source NODE 22a to the destination NODE, which is NODE 27a in the exemplary embodiment, is referred to herein as a "NODE-to-NODE data transfer".

Similarly, the processor 30a may interact with the bandwidth allocator module 30b to formulate a plurality of system management control messages that can be communicated to the source NODE 22a to control the source NODE 22a to communicate a predetermined number of data packets for a predetermined period of time or duration to the controller 30, which is referred to herein as a "NODE-to-controller data transfer". The predetermined number of data packets communicated to the controller 30 from the source NODE 22a, during a NODE-to-controller data transfer, permits the controller 30 to collect information necessary for performing system maintenance functions, such as maintaining records of statistical information related to network traffic and to schedule NODE-to-NODE transfers based on the statistical information.

In an embodiment, the plurality of control messages formulated by the interactions between the processor 30a and the bandwidth allocator 30b may include a plurality of bandwidth-allocation messages (hereinafter referred to as "BAMs"). A BAM, for example, specifies a source address associated with the source NODE 22a, a destination address associated with the destination NODE 27a and a number of data packets or bytes that the source NODE 22a may communicate to the destination NODE 27a over a predetermined time interval or duration. The plurality of system management control messages formulated by the interactions between the processor 30a and the bandwidth allocator 30b may be similarly formulated as the BAMs, as described above, however, the destination address is associated with the controller 30 instead of the destination NODE 27a.

The SWITCH_BLADE 40 located on the headend controller 15 includes a switching network 40a. The switching network 40a includes a matrix of switching elements (not shown) having a plurality of inputs and a plurality of outputs. The plurality of inputs and the plurality of outputs of the matrix of switching elements may be adapted to be coupled to NODEs 22 and 27 over the fifth data bus 85, via the node cluster blade 60b. The switching network 40a further includes a number of control inputs 40b coupled to the controller 30 over the second data bus 70. In this arrangement, the switching network 40*a* can receive a plurality of control signals from the controller 30 at the control inputs 40*b*, which operate to actuate the switching network 40*a* to directly couple any two or more of the plurality of NODEs 22 and 27. As a result of directly coupling any two or more of the plurality of NODEs 22 and 27, as described above, a bufferless data path can be formed between the coupled two or more of the plurality of NODEs 22 and 27.

It should be understood that the controller 30 may actuate the switching network 40*a* frequently to form a plurality of bufferless data communication paths between two or more NODEs of the plurality of NODEs 22 and/or 27 during NODE-to-NODE data transfers or between one or more NODEs 22 and/or 27 and the controller 30 during NODE-to-controller transfers. In one embodiment, the switching network 40*a* can include a solid-state electronic crosspoint switch. In another embodiment, the switching network 40*a* can include an optical crosspoint switch. The SWITCH_BLADE thus redirects all data from an incoming s cluster blades and access blades via a crosspoint switch to the destination node cluster blade(s).

The BAM generation circuit is a single board computer, which includes a microprocessor, memory and all support circuitry. BAM frames are generated by the processor and sent to an FPGA (BAM framing circuit), which will time stamp the BAM block and begin to serially transmit the messages out onto the control channel. This is where two BAM wheels, primary and secondary, are located (a BAM wheel is a list of BAMs that the BAM generation circuit repeatedly cycles though). The SWITCH_BLADE redirects all data from incoming node cluster blades and access blades via a crosspoint switch to the destination node cluster blade(s). Also resident on this BLADE is a BAM generation and framing circuit. The BAM framer will generate and distribute BAM frames to all node cluster blades. BAM frames are transmitted electrically, converted to optical and distributed to all node cluster blades via the OPTICAL_BACKPLANE.

Localized processing on the SWITCH_BLADE was chosen for this design to alleviate bandwidth conditions on the management portion of the optical backplane, otherwise the BAM frames would need to be generated by a different entity and transmitted to the SWITCH_BLADE for framing and distribution.

The access blade 50 includes one or more network interface modules 50*a* and 50*b* (hereinafter referred to as "NIMs"). The NIMs 50*a*, 50*b* provide an interface between NODEs 22 and 27 and one or more storage systems (not shown) coupled to an external storage area network (SAN). The NIMs 50*a* and 50*b* are additionally adapted to provide an interface to the plurality of NODEs 22 and 27 for a number of data processing systems (not shown) coupled to an external LAN.

In one embodiment, the access blade 50 includes a NIM 50*a* compatible with Gigabit Ethernet (GbE) and a NIM 50*b* compatible with Fibre Channel (FC). The GbE NIM 50*a* is a module that allows GbE compliant devices to receive from and transmit to the TOPIX rings (e.g. rings 20, 25 in FIG. 2). The access blade 50 interfaces to the TOPIX rings 20, 25 in the same way as a node cluster blade 60. Similarly, as will be described below in conjunction with FIG. 6, the FC NIM 50*b* is the FC equivalent of the GbE NIM 100. The access blade 50 allows a GbE NIM and an FC NIM to interface to an optical backplane and also converts signals from parallel to serial and vice versa. Thus, by including both a NIM 50*a* compatible with Gigabit Ethernet (GbE) and a NIM 50*b* compatible with Fibre Channel (FC), blade 50 can connect to legacy networks and can be used to interconnect multiple controllers 30.

The Fibre Channel NIM provides an interface to the plurality of NODEs 22 and 27 for data storage systems coupled to the external SAN. As described above, the data storage systems can include tape drive systems, disk drive systems, optical storage systems, magneto-optical storage systems and/or solid state storage systems. The data storage systems, which are coupled to the external SAN, may interface to the plurality of NODEs 22 and 27 respectively located on the first 20 and second 25 node clusters, via the Fibre Channel NIM, to communicate data to and receive data from the plurality of NODEs located on the first 20 and second 25 node clusters.

The Gigabit-Ethernet (GbE) NIM provides an interface to the plurality of NODEs 22 and 27 for data processing systems coupled to the external LAN. As described above, the data processing systems can include servers, workstations and/or personal computers. The data processing systems, which are coupled to the external LAN, may interface to the plurality of NODEs 22 and 27 respectively located on the first 20 and second 25 node clusters, via the GbE NIM, to communicate data to and from the plurality of NODEs 22 and 27.

Each access blade card can accommodate six NIMs for GbE or FC interfaces, each NIM having two ports. These GbE NIM and FC NIM access modules interface to the TOPIX rings in the same way as a node cluster blade (e.g. node cluster blade 60*a*). This allows the headend controller blade 30 to have interchangeable blades throughout the chassis. Each access blade 50 has six node clusters per blade with each module having two ports per node cluster for a total of twelve ports per access blade. two ports.

The node cluster blade 60*b* includes a plurality of pairs of communication ports that are each adapted to couple to each node cluster. For example, the node cluster blade 60*b* includes a first pair of ports 62*a* adapted to couple to the first node cluster 20 and a second pair of ports 62*b* adapted to couple to the second node cluster 25. The primary operation of the node cluster blade is to take the data and control channels from the SWITCH_BLADE, and optically multiplex them onto the distribution rings as well as demultiplexing the data and control from the collection ring and sending the data up the optical interconnect to the SWITCH_BLADE.

TOPIX ring failover circuitry is located on node cluster blades 60 and is used by the headend controller 30 to determine if a fiber has been cut on the node cluster to which a particular node cluster blade is coupled. If any one or all of the fibers loses a control channel or pilot tone, one or more bits will be set in a register which will inform the headend controller that a node cluster has had a fiber cut. Once it is determined that a cut has been sustained, the headend controller will inform the node cluster blade to localize the cut and take corrective action if possible.

Figure 3:
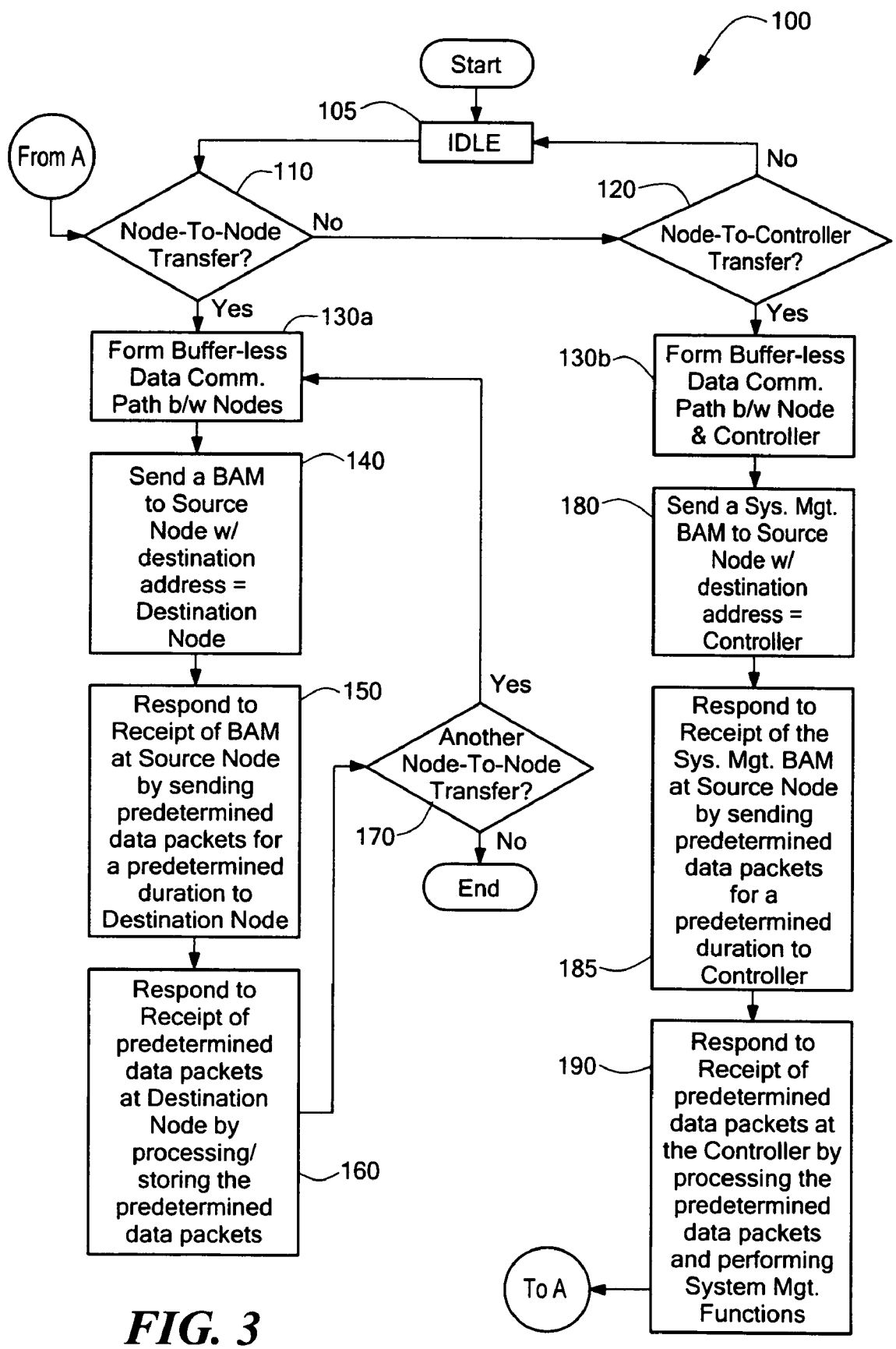
FIG. 3 is a flow chart illustrating process steps for communicating on the network of FIG. 1.

Referring to FIG. 3, a method 100 of communicating a plurality of data packets over a first bufferless data communication path of a plurality of bufferless data communication paths formed between two or more of the plurality of NODEs 22 and/or 27, or between one or more of the plurality of NODEs 22 and/or 27 and the controller 30 using the common protocol may begin from an idle state, at step 105, from which the controller 30 begins processing, to step 110 where a determination is made by the controller as to whether to execute a NODE-to-NODE data transfer. If the controller 30 determines to execute a NODE-to-NODE data transfer, at step 110, the controller 30 further communicates predetermined control signals to the control inputs of the switching network 40*a*, which is located on the SWITCH_BLADE 40, to actuate the switching network 40*a* to form a predetermined bufferless data communication path between a source NODE and a destination NODE. The source and destination NODEs are selected from the plurality of NODEs 22 and 27, at step 130*a*.

At step 140, the controller 30 formulates and sends a BAM to the source NODE (e.g. NODE 22*a* in FIG. 1). The BAM sent from the controller 30 to the source NODE includes a destination address associated with the destination NODE (e.g. NODE 27*a* in FIG. 1) of the plurality of NODEs 22 and 27 and instructions for the source NODE to communicate one or more predetermined data packets to the destination NODE, which is located at the destination address included in the BAM. The BAM further includes instructions for the source NODE to communicate the data packet(s) to the destination NODE for a predetermined time duration or during a predetermined time interval.

At step 150, the source NODE receives and responds to receipt of the BAM, as described above, by communicating the data packet(s) to the destination NODE for the predetermined time duration or during the predetermined time interval, as specified in the BAM. The data packet(s) are communicated from the source NODE to the destination NODE over the bufferless data communication path, which was previously formed above in connection with step 130*a*.

At step 160, the destination NODE may receive and respond to receipt of the data packet(s) provided by the source NODE by processing and/or storing the data packets at the destination NODE. After receiving the data packet(s) at the destination NODE, the method 100 further includes the controller 30 determining whether to formulate and execute another NODE-to-NODE transfer, at step 170. If it is determined to formulate and execute another NODE-to-NODE transfer, at step 170, the method is directed back to step 130*a*, and the above described steps 130*a* through 160 are repeated. For example, the controller 30 may formulate and send another BAM to another source NODE, for example NODE 22*b*, to instruct the source NODE 22*b* to communicate another one or more predetermined data packets to the same destination NODE or to another destination NODE, for example NODE 27*b*, during another predetermined time duration or interval. Furthermore, the above described steps 130*a* through 170 may be cyclically repeated until it is determined by the controller 30, at step 170, that another NODE-to-NODE transfer is not desired or required. If it is determined by the controller 30, at step 170, that another NODE-to-NODE transfer is not desired or required, the method 100 ends at step 175.

At step 110, as described above, if it is determined by the controller 30 not to execute a NODE-to-NODE data transfer, the method 100 further includes the controller 30 determining whether to execute a NODE-to-controller data transfer, at step 120. If it is determined by the controller 30, at step 120, not to execute a NODE-to-controller data transfer, the controller 30 remains idle, at step 105. On the other hand, if it is determined by the controller 30, at step 120 to execute a NODE-to-controller data transfer, then in a similar manner as that described above in connection with step 130*a*, the controller 30 communicates predetermined control signals to the control inputs 40*b* of the switching network 40*a*, which is located on the SWITCH_BLADE 40, to actuate the matrix of switching elements included therein to form a predetermined bufferless data communication path directly between a source NODE (e.g. the source NODE 22*a* of the plurality of NODEs 22 and 27) and the controller 30, at step 130*b*. It should be understood that the controller 30 can control the switching network 40*a* to form a bufferless data communication path between itself and any one or more of the NODEs 22 and/or 27 respectively located on the first 20 and second 25 node clusters during NODE-to-controller data transfers.

At step 180, the controller 30 formulates and sends a system management BAM to the source NODE. The system management BAM may be similar to the BAMs described above, except the destination address is associated with the controller 30 instead of the destination NODE 27*a*. At step 185, the source NODE receives and responds to receipt of the system management BAM by communicating one or more predetermined data packets to the controller 30 over the bufferless data communication path, which was previously formed between the source NODE and the controller 30, for the predetermined duration or during the predetermined time interval. The plurality of predetermined data packets communicated from the source NODE to the controller 30 may include, for example, statistical information, frequency of BAM receipts or other information that the controller 30 may process to manage and adjust system operations.

At step 190, the controller 30 receives and processes the one or more data packets communicated from the source NODE 22*a* for the predetermined duration or during the predetermined time interval. As described above, the controller 30*a* may process the plurality of predetermined data packets and perform system management functions, which may include adjusting the order and/or frequency for which BAMs are communicated to the plurality of NODEs 22 and 27 respectively located on the first 20 and second 25 node clusters. After completely processing the plurality of predetermined data packets and performing system management functions, at step 190, the method 100 may be redirected to step 110 and any one or more of the above described steps 110 through 185 can be repeated.

Figure 4:
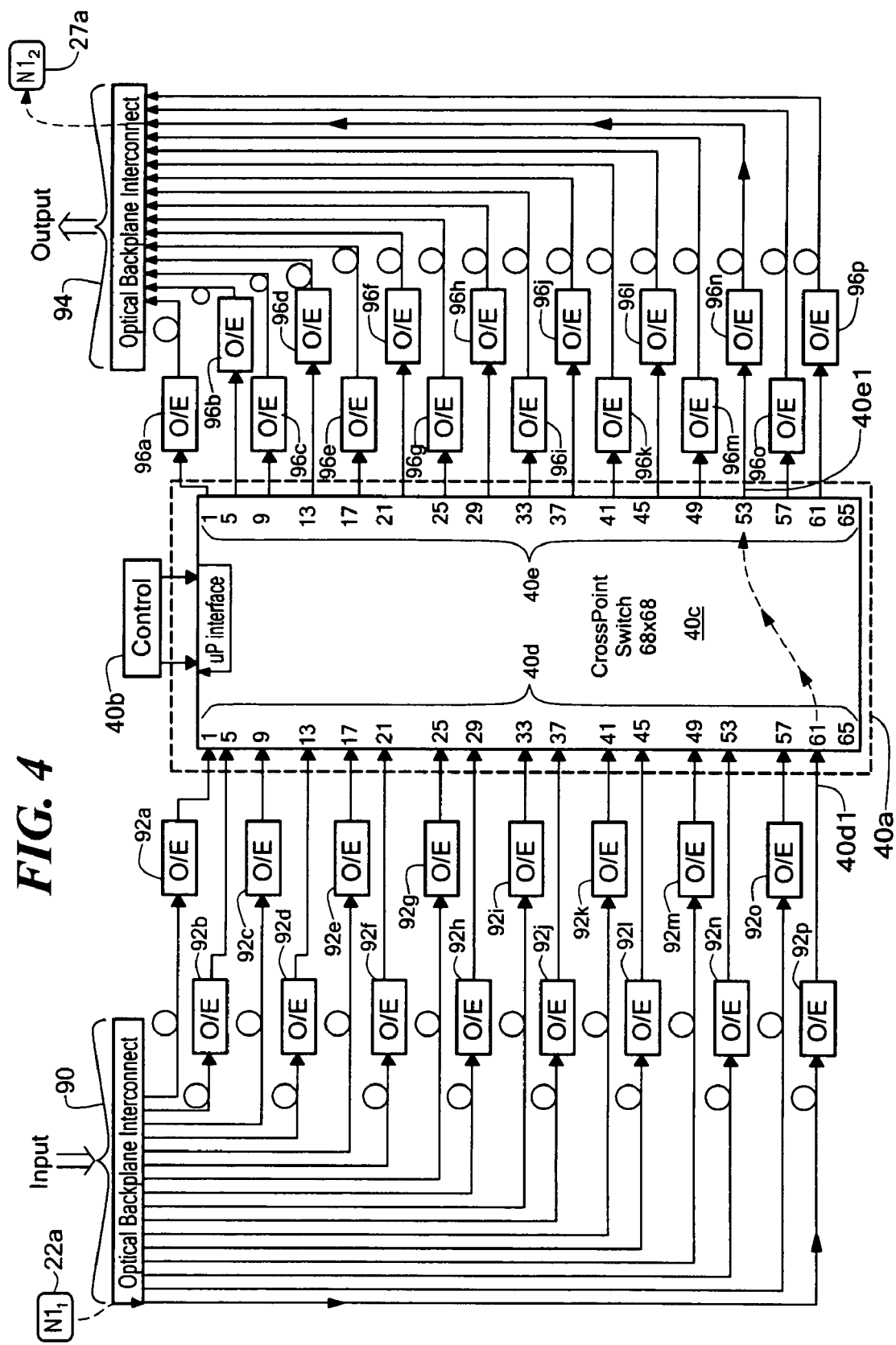
FIG. 4 is a schematic diagram of a switching network included in the network of FIG. 2.

Referring to FIG. 4, an exemplary embodiment of the switching network 40*a*, which is included on the SWITCH_BLADE 40 of FIG. 2, can include a centrally located electronic crosspoint switch 40*c*. The electronic crosspoint switch 40*c* can include a plurality of inputs 40*d* and a plurality of outputs 40*e*. The plurality of inputs 40*d* of the electronic crosspoint switch 40*c* can be coupled to a first optical backplane interconnect 90 or connector, via a plurality of optical-to-electrical signal converters 92*a*, 92*b*, 92*c*, 92*d*, 92*e*, 92*f*, 92*g*, 92*h*, 92*i*, 92*j*, 92*k*, 92*l*, 92*m*, 92*n*, 92*o* and 92*p*, which are collectively referred to herein after as "optical-to-electrical signal converters 92". The plurality of outputs 40*e* of the electronic crosspoint switch 40*c* can be coupled to a second optical backplane interconnect or connector, via a plurality of electrical-to-optical signal converters 96*a*, 96*b*, 96*c*, 96*d*, 96*e*, 96*f*, 96*g*, 96*h*, 96*i*, 96*j*, 96*k*, 96*l*, 96*m*, 96*n*, 96*o* and 96*p*, which are collectively referred to herein as "electrical-to-optical signal converters 96."

The first 90 and second 94 optical backplane interconnects, which are respectively coupled to the plurality of inputs 40*d* and to the plurality of outputs 40*e* of the electronic crosspoint switch 40*c*, can be coupled to the plurality of NODEs 22 located on node cluster 20 and to the plurality of NODEs 27 located on node cluster 25, via the node cluster blade 60*b*. In this arrangement, the electronic crosspoint switch 40*c* can be actuated to selectively couple any two or more NODEs 22 and/or 27. The selective coupling of any two or more NODEs 22 and/or 27 is controlled by a plurality of control signals received at the control inputs 40b of the crosspoint switch 40c, as described below in detail.

The control inputs 40b of the electronic crosspoint switch 40c can be coupled to the controller blade 30 over the second data bus 70, as shown in FIG. 2. The control inputs 40b are adapted to receive a plurality of control signals from the controller 30, which are operative to actuate the electronic crosspoint switch 40c to selectively couple at least one input, such as input 40d1, of the plurality of inputs 40d of the electronic crosspoint switch 40c to at least one output, such as output 40e1, of the plurality of outputs 40e of the electronic cross point switch 40c. Since the plurality of NODEs 22 and 27 are coupled to the plurality of inputs 40d and to the plurality of outputs 40e of the electronic crosspoint switch 40c, actuation of the electronic crosspoint switch 40c, as described above, can be carried out to also selectively couple at least two NODEs, for example NODEs 22a and 27a, of the plurality of NODEs 22 and 27.

For example, the controller 30 can execute the transfer of data from NODE 22a (e.g. source NODE) to the NODE 27a (e.g. destination NODE) by providing a plurality of predetermined control signals to the control input 40b of the electronic crosspoint switch 40c to actuate the electronic crosspoint switch 40c to couple the input 40d1 to the output 40e1. Thereafter, the controller 30 can provide a BAM to NODE 22a to instruct NODE 22a to source one or more predetermined data packets for a predetermined duration to NODE 27a.

Although not shown, it should be readily understood that in another exemplary embodiment, the electronic crosspoint switch 40c can be substituted with an optical crosspoint switch.

The optical crosspoint switch can be similarly constructed and arranged as the electronic crosspoint switch 40c and includes a plurality of similar inputs and a plurality of similar outputs. The plurality of inputs of the optical crosspoint switch can be coupled directly to the first optical backplane interconnect 90 and the plurality of outputs of the optical crosspoint switch can be coupled directly to the second optical backplane interconnect 94.

Similar to the electronic crosspoint switch 40c, as described above, the first 90 and second 94 optical backplane interconnects, which are respectively coupled to the plurality of inputs and to the plurality of outputs of the optical crosspoint switch, can each be coupled to the plurality of NODEs 22 located on node cluster 20 and to the plurality of NODEs 27 located on node cluster 25, via the node cluster blade 60b. In this arrangement, the optical crosspoint switch can be actuated to selectively couple any two or more NODEs 22 and/or 27, which coupling is based on a plurality of control signals received at control inputs of the optical crosspoint switch, which are similar to the control signal provided to the control input 40b of the electronic crosspoint switch 40c, as described above.

Figure 5:
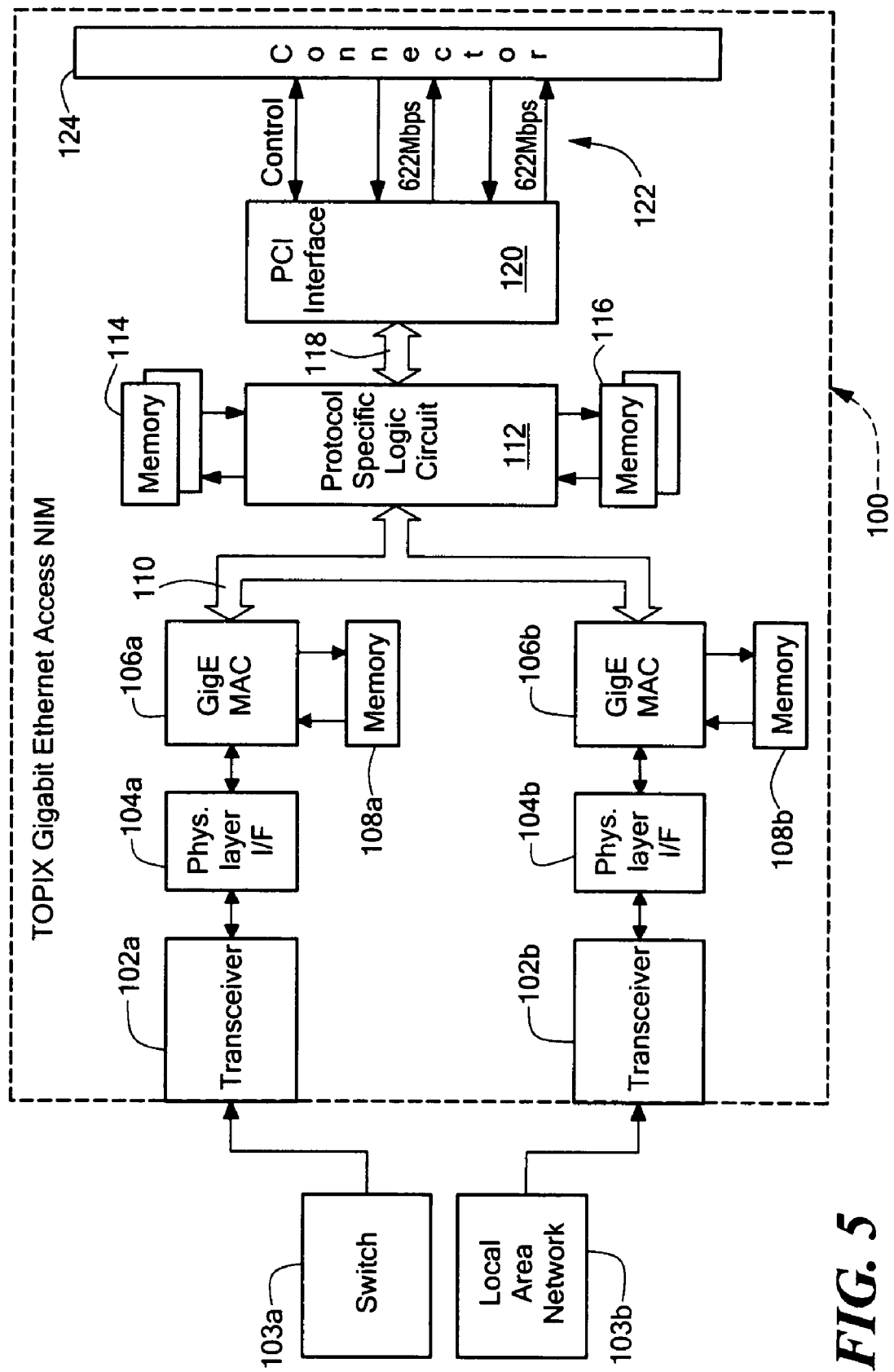
FIG. 5 is a block diagram of a Gigabit Ethernet (GbE) network interface module (NIM)

Referring to FIG. 5, a Gigabit Ethernet (GbE) network interface module (NIM) or blade 100 allows an external Ethernet switch 103a and GbE LAN 103b to attach to a headend (e.g. controller 30 in FIG. 2). The front panel interface of this blade can be provided from industry-standard transceivers. In the exemplary embodiment of FIG. 5, the GbE NIM 100 includes two standard GbE ports 102a, 102b which are here provided from conventional GBIC transceiver circuits.

In this exemplary embodiment, port 102a couples GbE NIM 100 to the switch 103a and port 102b couples the GbE NIM to the LAN 103b. A conventional physical layer interface circuit 104 (e.g. a SERDES) couples the transceiver 102a to a GbE medium access controller (MAC) 104. The MAC 104 has a buffer memory 108 coupled thereto. A bus 110 couples the MAC 104 to a protocol specific logic circuit (PSLC) 112 which implements a predetermined communication protocol (e.g. a TOPIX protocol). The PSLC 112 may be implemented, for example, as a field programmable gate array (FPGA) or as an application specific integrated circuit (ASIC). Storage devices 114, 116 are coupled to the PSLC 112 to act as buffer memories. In one exemplary embodiment, storage device 114 is provided as a static random access memory (SRAM) and storage device 116 is provided as a dynamic random access memory (DRAM).

A bus 118 couples the PSLC 112 to a PCI interface circuit 120. In one exemplary embodiment, interface circuit 120 is implemented in a FPGA as a PCI to low-voltage-differential signal (LVDS) interface circuit. Control and data signal paths 122 couple signals between the interface circuit 120 and a connector 124.

The GbE NIM 100 acts as a proxy for all external LANs that need access to ONS NODEs (e.g. NODEs 22 in FIG. 2). When a new packet arrives at a GbE NIM port (e.g. port 102a), with a destination address that resides on one of the TOPIX rings, the GbE NIM 100 performs a discovery operation for the destination address since it doesn't know if the destination address is within one of the TOPIX rings (e.g. rings 20, 25 in FIG. 2). The GbE NIM queues all packets entering the port and signals the headend controller that one or more packets have arrived with an unknown destination NODE. Upon receiving call setup data from the headend controller, the GbE NIM has learned the destination address and transmits this packet as well as any subsequent packets in this frame to the destination ONS NODE (e.g. a TOPIX destination ONS NODE) as soon as it can. This process is repeated any time a packet arrives at a port without the GbE NIM knowing the destination address.

The GbE NIM transmits to the external LAN in a first-in-first-out (FIFO) type fashion since the burden of discovery and/or knowledge of the external LAN resides at the headend controller and sending ONS NODE.

Figure 6:
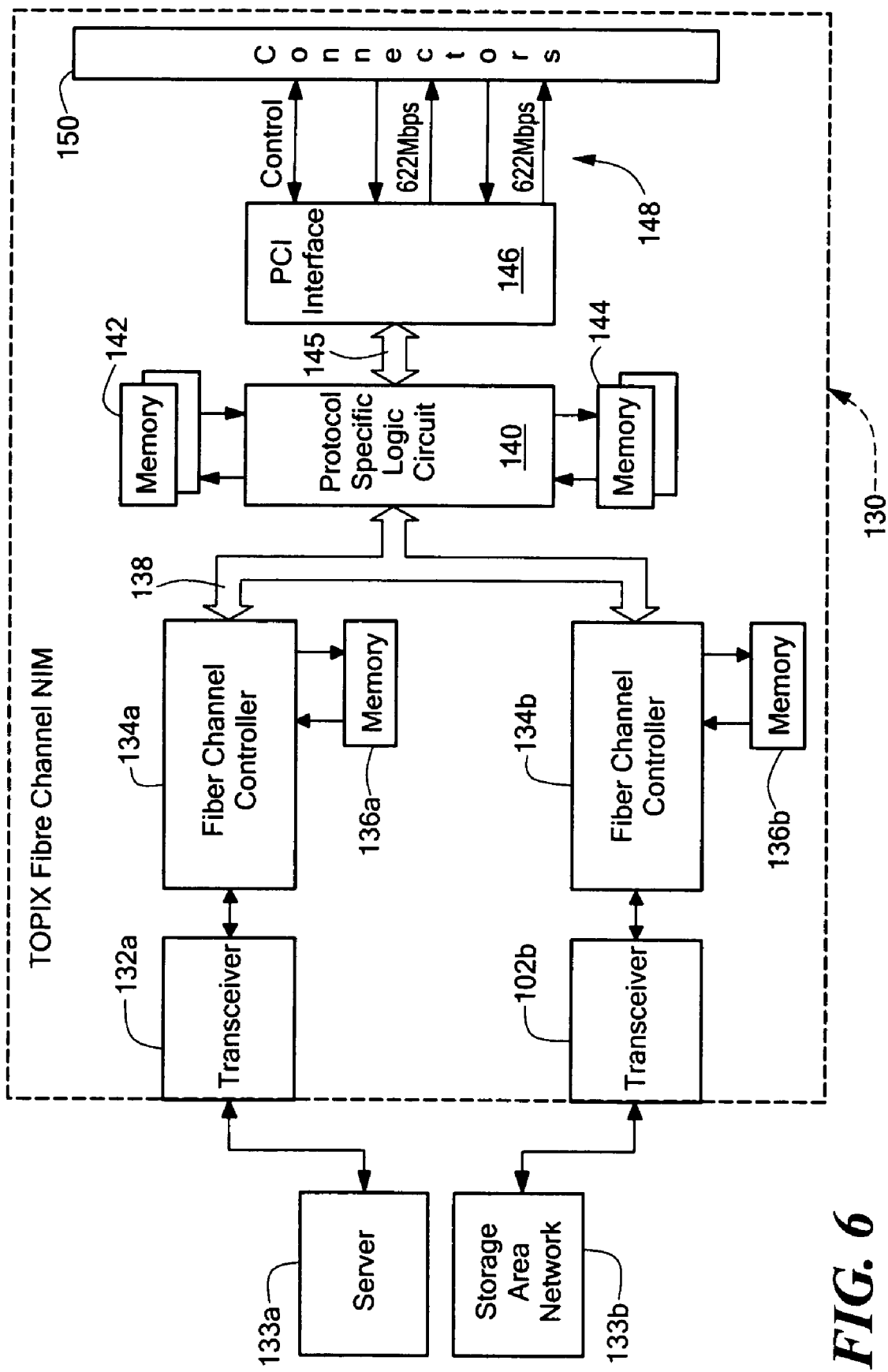
FIG. 6 is a block diagram of a Fibre Channel (FC) network interface module (NIM).

Referring now to FIG. 6, a FC NIM 130 includes a pair of FC ports 132a, 132b here provided from a 1G/2G SFP. The FC NIM allows an external storage area network (SAN) 133b to attach to the TOPIX rings (e.g. rings 20, 25 in FIG. 2). In this exemplary embodiment, the front panel interface (e.g. ports 132a, 132b) of the FC NIM 130 corresponds to conventional 850 nanometer (nm) SFP transceivers which can operate at either one (1.0625) or two (2.125) gigabit FC. Other interfaces may, of course, also be used.

In this exemplary embodiment, port 132a is coupled to a server 133a and port 132b is coupled to a SAN 133b. The SFP transceivers 132a, 132b are coupled to respective ones of fiber channel controllers 134a, 134b. The controllers 134a, 134b each have a buffer memory 136a, 136b coupled thereto. A bus 138 couples the controllers 134a, 134b to a protocol specific logic circuit (PSLC) 140 which implements a predetermined communication protocol (e.g. a TOPIX protocol). The PSLC 140 may be implemented, for example, as a field programmable gate array (FPGA) or as an application specific integrated circuit (ASIC). Storage devices 142, 144 are coupled to the PSLC 140 to act as buffer memories. In one exemplary embodiment, storage device 142 is provided as a static random access memory (SRAM) and storage device 144 is provided as a dynamic random access memory (DRAM).

A bus 145 couples the FPGA 140 to a PCI interface circuit 146. In one embodiment, the PCI interface circuit can be implemented in an FPGA as a PCI to LVDS interface circuit 146. Control and data signal paths 148 couple signals between the interface circuit 146 and a connector 150.

The FC NIM 130 is divided into three major engines: (1) FC, (2) DMA (Direct Memory Access), and (3) TOPIX. The FC engine's sole responsibility is to ensure that the FC NIM adheres to FC protocol standards. The SC NIM has the characteristics of an F-port or FL-port, which means that the FC NIM can attach to an N-port, NL-port, or an E-port. Data received from an external SAN (e.g. SAN 133b) will be sent to the DMA engine while also sending a FC acknowledgement-primitive back to attached FC port. The DMA engine includes a processor and associated hardware to queue all inbound packets until the necessary call setup information is sent to the headend controller. Once the headend controller receives the signaling data, transmission onto the TOPIX ring(s) can commence in an orderly fashion as dictated by BAM frames. The TOPIX engine will take the queued data and transmit it onto the TOPIX ring in accordance with the TOPIX protocol.

The FC_NIM is a proxy for all external SANs that need access to TOPIX NODEs. When a new packet arrives at an FC NIM port, with a destination address that resides on one of the TOPIX rings, the FC NIM performs a discovery operation for the destination address since it doesn't know if the destination address is within one of the TOPIX rings. The FC NIM queues all packets entering the port and signals the headend controller that one or more packets have arrived with an unknown destination (TOPIX NODE). Upon receiving call setup data from the headend controller, the FC NIM has learned the destination address and will transmit this packet as well as any subsequent packets in this frame to the destination NODE (e.g. a TOPIC destination NODE) as soon as it can. This process is repeated any time a packet arrives at a port without the FC NIM knowing the destination address.

As with the GbE NIM 100 (FIG. 5), the FC_NIM transmits to the external SAN in a FIFO (first-in-first-out) type fashion since the burden of discovery and/or knowledge of the external SAN resides at the headend controller and sending ONS NODE.

Having described the preferred embodiments of the invention, it will now become apparent to one of ordinary skill in the art that other embodiments incorporating their concepts may be used. It is felt therefore that these embodiments should not be limited to disclosed embodiments.

What is claimed is:

1. A system for bufferless data communications between a plurality of nodes coupled to the system using a common protocol, the system comprising:
    a controller configured to formulate and communicate a plurality of messages in the common protocol;
    a switching network coupled to the controller; and
    at least one node cluster module coupled to the switching network and to the plurality of nodes, wherein the controller actuates the switching network to form a bufferless coupling between at least a first node of the plurality of nodes and at least a second node of the plurality of nodes, and wherein the controller communicates at least a first message of the plurality of messages in the common protocol to at least the first node of the plurality of nodes via the node cluster module to instruct the first node of the plurality of nodes to communicate predetermined data in the common protocol for a predetermined duration to the second node of the plurality of nodes over the bufferless coupling.

2. The system for bufferless data communications of claim 1, wherein the controller includes a bandwidth allocation module operative to formulate at least the first message of the plurality of messages in the common protocol and to dynamically adjust the predetermined duration.

3. The system for bufferless data communications of claim 1, wherein the switching network includes an electronic crosspoint switch having a plurality of inputs and a plurality of outputs, whereby at least one of the plurality of inputs and at least one of the plurality of outputs is coupled to at least a first group of nodes of the plurality of nodes via the at least one node cluster module.

4. The system for bufferless data communications of claim 3, wherein the switching network further includes an optical-to-electrical converter coupled between each of the plurality of inputs of the switching network and the node cluster module.

5. The system for bufferless data communications of claim 4, wherein the switching network further includes an electrical-to-optical converter coupled between each of the plurality of outputs of the switching network and the node cluster module.

6. The system for bufferless data communications of claim 1, wherein the switching network includes an optical crosspoint switch having a plurality of inputs and a plurality of outputs, whereby at least one of the plurality of inputs and at least one of the plurality of outputs is coupled to at least a first group of nodes of the plurality of nodes via the at least one node cluster module.

7. The system for bufferless data communications of claim 6, wherein the at least one node cluster module includes a plurality of pairs of ports that are configured to permit at least the first group of nodes of the plurality of nodes to couple to the at least one node cluster module.

8. The system for bufferless data communications of claim 1, wherein the plurality of nodes includes two or more of a server system, a disk drive storage system, a tape drive storage system, an optical storage system or a magneto-optical storage system.

9. The system for bufferless data communications of claim 1, wherein the system further includes at least one access module coupled to the switching network that is configured to accept one or more network interface cards.

10. The system for bufferless data communications of claim 9, wherein the one or more network interface cards includes at least one Gigabit Ethernet card.

11. The system for bufferless data communications of claim 9, wherein the one or more network interface cards includes at least one Fibre Channel card.

12. The system of claim 1, wherein the plurality of nodes comprises a data processing system and a data storage system.

13. A method of communicating information over a bufferless data communication system including a switching network coupled to a controller and to a plurality of nodes, the method comprising:
    forming at least one bufferless data communication path between at least a first node of the plurality of nodes and at least a second node of the plurality of nodes by providing predetermined control signals to the switching network from the controller; and
    communicating at least one predetermined instruction message from the controller to the first node, wherein the first node responds to receipt of the at least one predetermined instruction message by communicating one or more packets of data to the second node for a predetermined duration over the at least one bufferless data communication path.

14. The method of communicating the plurality of data packets over the bufferless communication system of claim 13, wherein providing the predetermined control signals to the switching network from the controller includes providing the predetermined control signals to an electronic crosspoint switch having a plurality of inputs coupled to the plurality of nodes and a plurality of outputs coupled to the plurality of nodes.

15. The method of communicating the plurality of data packets over the bufferless communication system of claim 14, wherein communicating the at least one predetermined instruction message includes communicating at least one bandwidth allocation message.

16. The method of claim 13, wherein the plurality of nodes comprises a data processing system and a data storage system.

17. A method of communicating a plurality of data packets over a bufferless communication system using a common protocol, the method comprising:

generating a first instruction message at a controller, the first instruction message including a source address associated with a first node of a plurality of nodes and a destination address associated with a second node of the plurality of nodes;

receiving the first instruction message at the first node of the plurality of nodes; and processing the first instruction message at the first node of the plurality of nodes by sending a plurality of predetermined packets of data for a predetermined duration to the second node of the plurality of nodes over a bufferless communication path formed by actuating a switching network to couple the first node and the second node of the plurality of nodes.

18. The method of claim 17, wherein the plurality of nodes comprises a data processing system and a data storage system.

19. A method of communicating information over a bufferless data communication system including a switching network coupled to a controller and to a plurality of nodes, the method comprising:

forming at least one bufferless data communication path between at least a first node of the plurality of nodes and the controller by providing predetermined control signals to the switching network from the controller; and communicating at least one predetermined instruction message from the controller to the first node, wherein the first node responds to receipt of the at least one predetermined instruction message by communicating one or more packets of data to the controller for a predetermined duration over the at least one bufferless data communication path.

20. The method of communicating the plurality of data packets over the bufferless communication system of claim 19, wherein communicating the at least one predetermined instruction message includes communicating at least one system management bandwidth allocation message.

21. The method of communicating the plurality of data packets over the bufferless communication system of claim 19, further comprising:

receiving the one or more packets of data for the predetermined duration over the at least one bufferless data communication path at the controller;

processing the data to determine predetermined characteristics of the first node; and adjusting characteristics associated with communications between the first node of the plurality of nodes and at least a second node of the plurality of nodes.

22. The method of claim 19, wherein the plurality of nodes comprises a data processing system and a data storage system.

* * * * *